United States Patent
Kay et al.

(10) Patent No.: US 6,473,893 B1
(45) Date of Patent: *Oct. 29, 2002

(54) INFORMATION OBJECTS SYSTEM, METHOD, AND COMPUTER PROGRAM ORGANIZATION

(75) Inventors: Jeffrey Kay, Springfield, VA (US); David Rusnak, Gaithersburg, MD (US); Mary Kao, Rockville, MD (US); Jeffrey Crigler, McLean, VA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,305

(22) Filed: May 30, 1997

(51) Int. Cl.[7] ................................ G06F 9/44
(52) U.S. Cl. .................................... 717/116
(58) Field of Search ............... 395/712, 200.3, 395/200.31, 680, 685; 707/1, 103, 2, 102; 717/114, 115, 116, 120

(56) References Cited

U.S. PATENT DOCUMENTS

| | | |
|---|---|---|
| 4,943,932 A | 7/1990 | Lark et al. |
| 5,119,475 A | 6/1992 | Smith et al. |
| 5,226,161 A | 7/1993 | Khoyi et al. |
| 5,261,080 A | 11/1993 | Khoyi et al. |
| 5,291,583 A | 3/1994 | Bapat |
| 5,295,256 A | 3/1994 | Bapat |
| 5,297,283 A | 3/1994 | Kelly, Jr. et al. |
| 5,307,499 A | 4/1994 | Yin |
| 5,315,703 A | 5/1994 | Matheny et al. |
| 5,367,633 A | 11/1994 | Matheny et al. |
| 5,369,766 A * | 11/1994 | Nankano et al. ............. 395/685 |
| 5,379,430 A | 1/1995 | Nguyen |
| 5,388,264 A | 2/1995 | Tobias, II et al. |
| 5,390,325 A | 2/1995 | Miller |
| 5,396,626 A | 3/1995 | Nguyen |
| 5,398,336 A * | 3/1995 | Tantry et al. ................ 707/103 |
| 5,404,528 A * | 4/1995 | Mahajan ...................... 395/712 |
| 5,404,534 A | 4/1995 | Foss et al. |
| 5,404,892 A | 4/1995 | Bretl |
| 5,432,925 A | 7/1995 | Abraham et al. |
| 5,446,842 A | 8/1995 | Schaefer et al. |
| 5,457,797 A | 10/1995 | Butterworth et al. |
| 5,459,868 A | 10/1995 | Fong |
| 5,463,769 A | 10/1995 | Tate et al. |
| 5,504,892 A | 4/1996 | Atsatt et al. |
| 5,544,302 A | 8/1996 | Nguyen |
| 5,581,761 A | 12/1996 | Radia et al. |
| 5,600,833 A * | 2/1997 | Senn et al. .................. 707/501 |
| 5,603,031 A | 2/1997 | White et al. |
| 5,613,148 A | 3/1997 | Bezviner et al. |
| 5,668,998 A | 9/1997 | Mason et al. |
| 5,675,752 A | 10/1997 | Scott et al. |
| 5,778,178 A * | 7/1998 | Arunachalam ............... 709/203 |
| 5,794,257 A * | 8/1998 | Liu et al. ........................ 707/1 |
| 5,920,861 A * | 7/1999 | Hall et al. ...................... 707/9 |
| 5,936,624 A * | 8/1999 | Lisle et al. .................. 345/348 |

* cited by examiner

Primary Examiner—Matthew Smithers
(74) Attorney, Agent, or Firm—Morgan & Finnegan, LLP

(57) ABSTRACT

An information object allows arbitrary structured or unstructured information to be bundled with instructions for processing. The object is packed into a container with a well defined structure that is processed on a client computer system. The client computer system possesses a runtime environment that processes the information object and allows it to communicate with other applications. The information object is fundamentally different from a file system or other types of container systems in its assignment of context to entries. By applying a context identifier, the runtime system which processes the information object, retrieves selected entries for selected tasks.

21 Claims, 11 Drawing Sheets

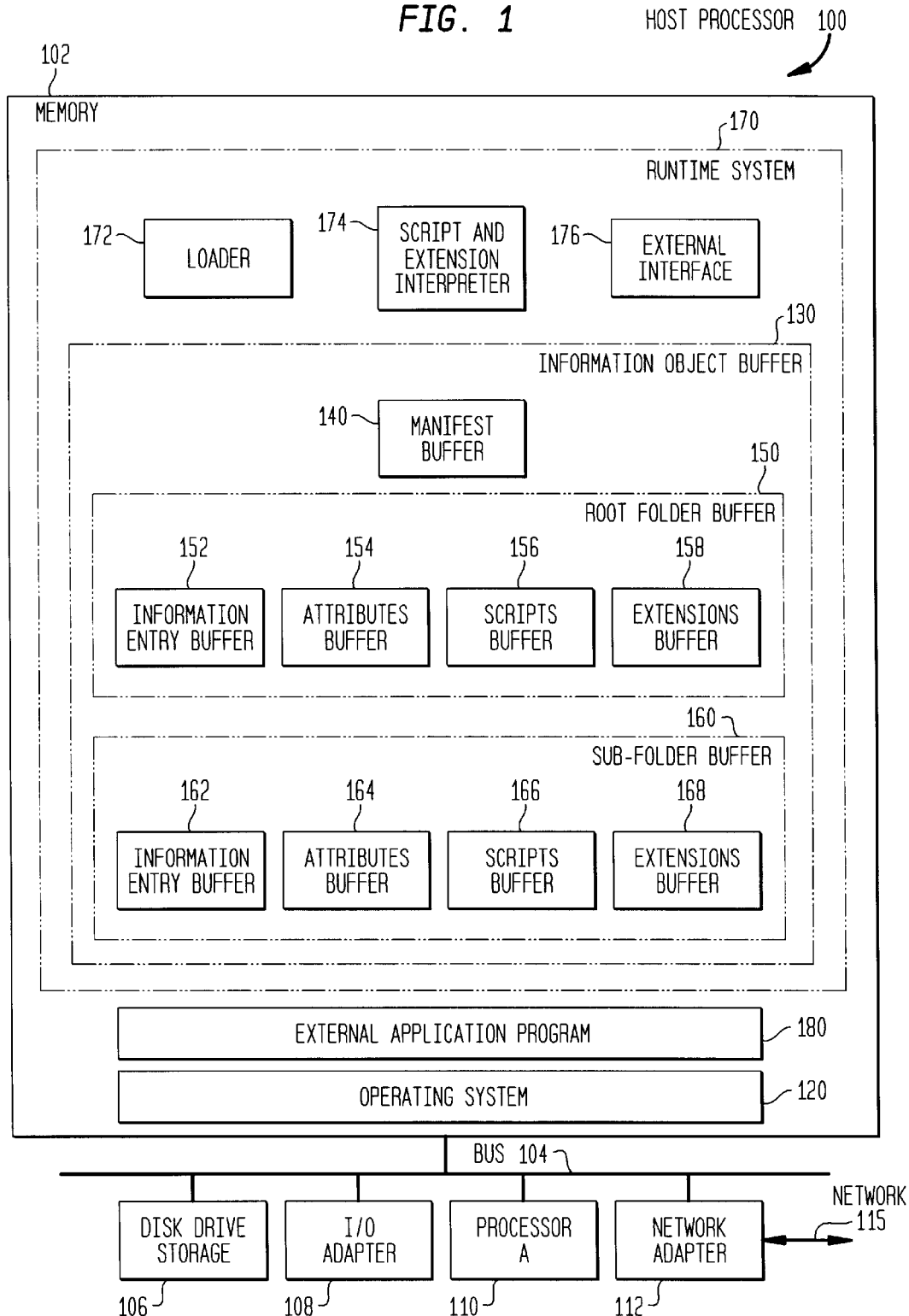

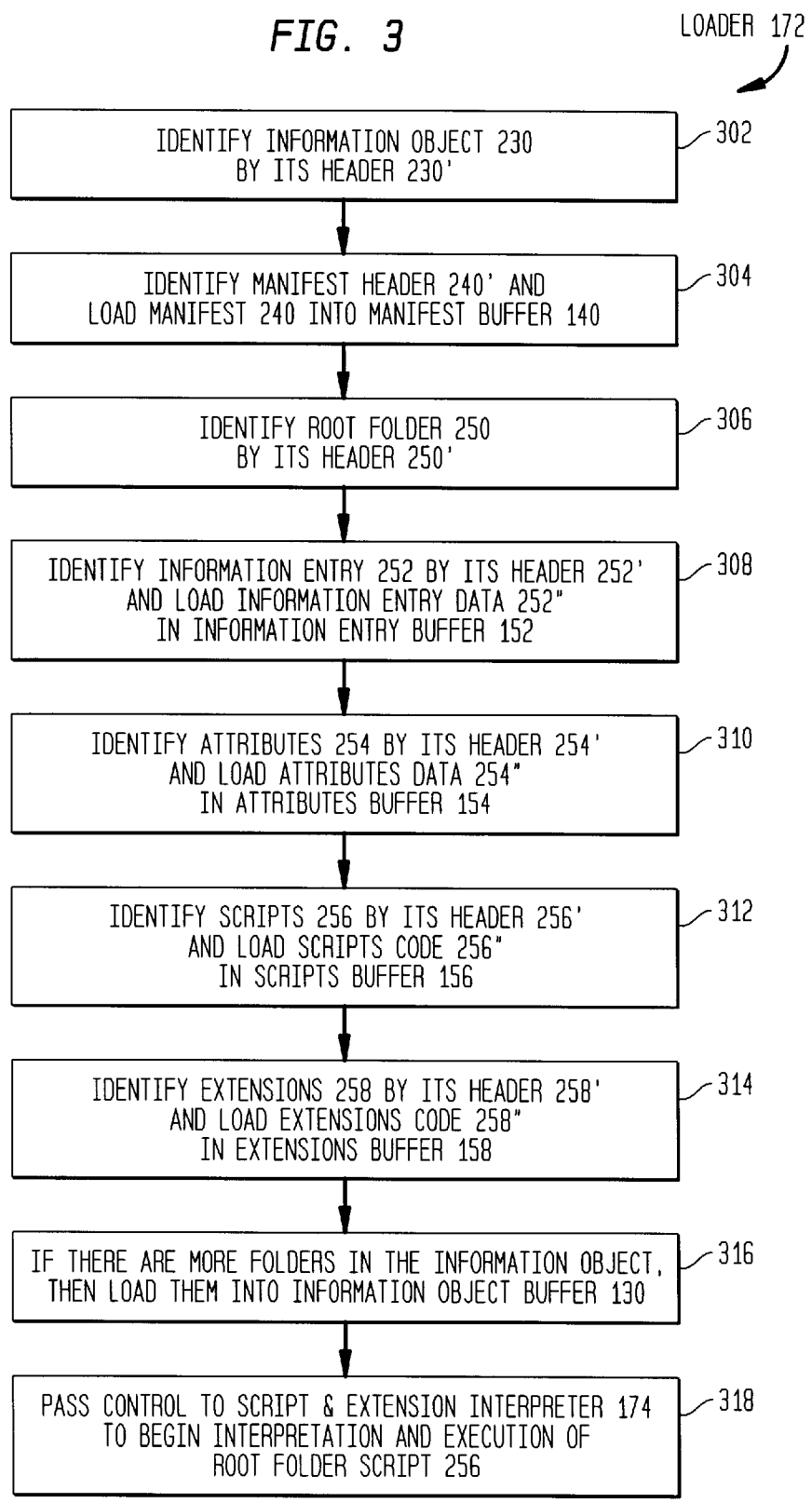

EXAMPLE OPERATION
OF INTERPRETER 174
AND EXTERNAL
PROGRAM 180'

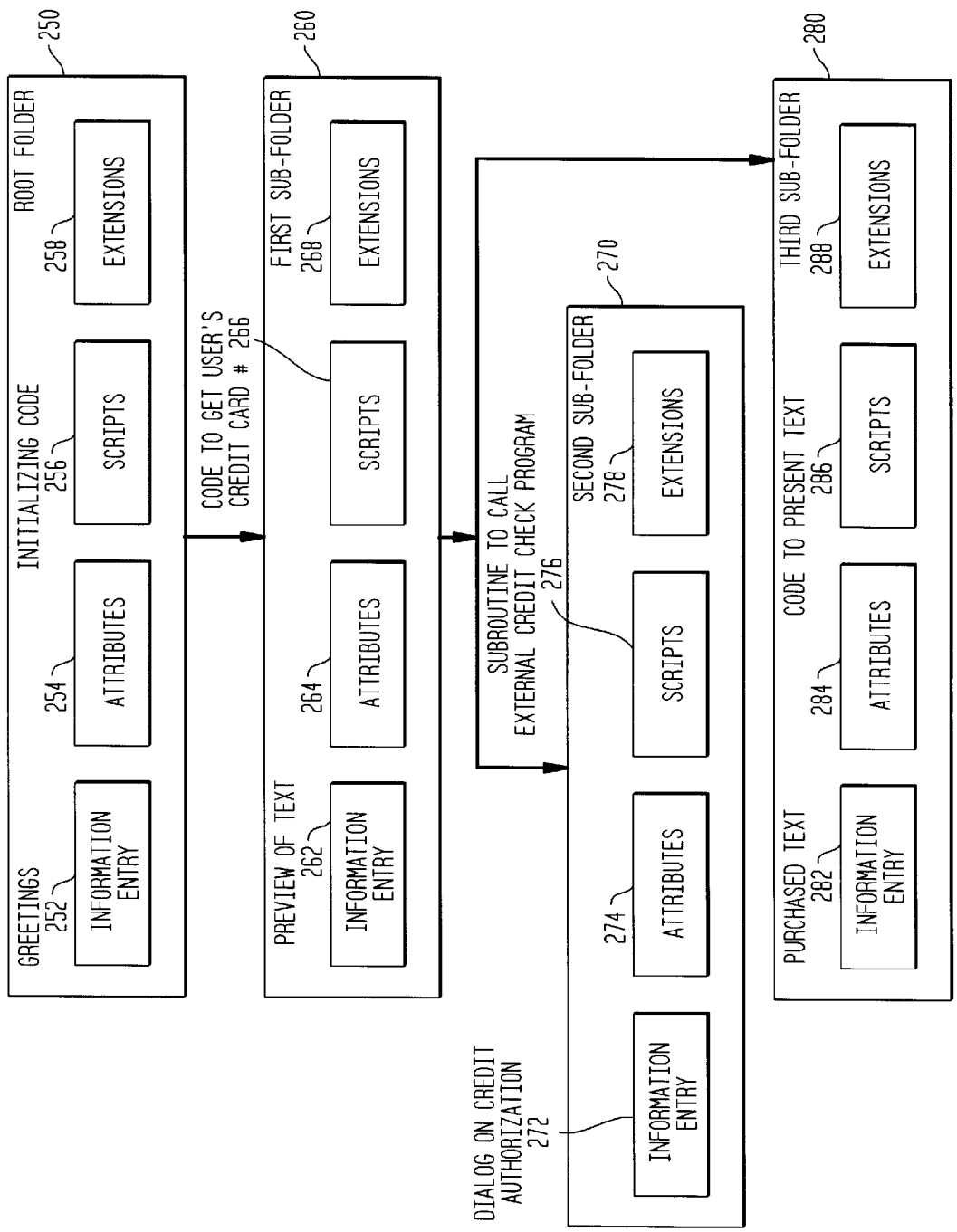

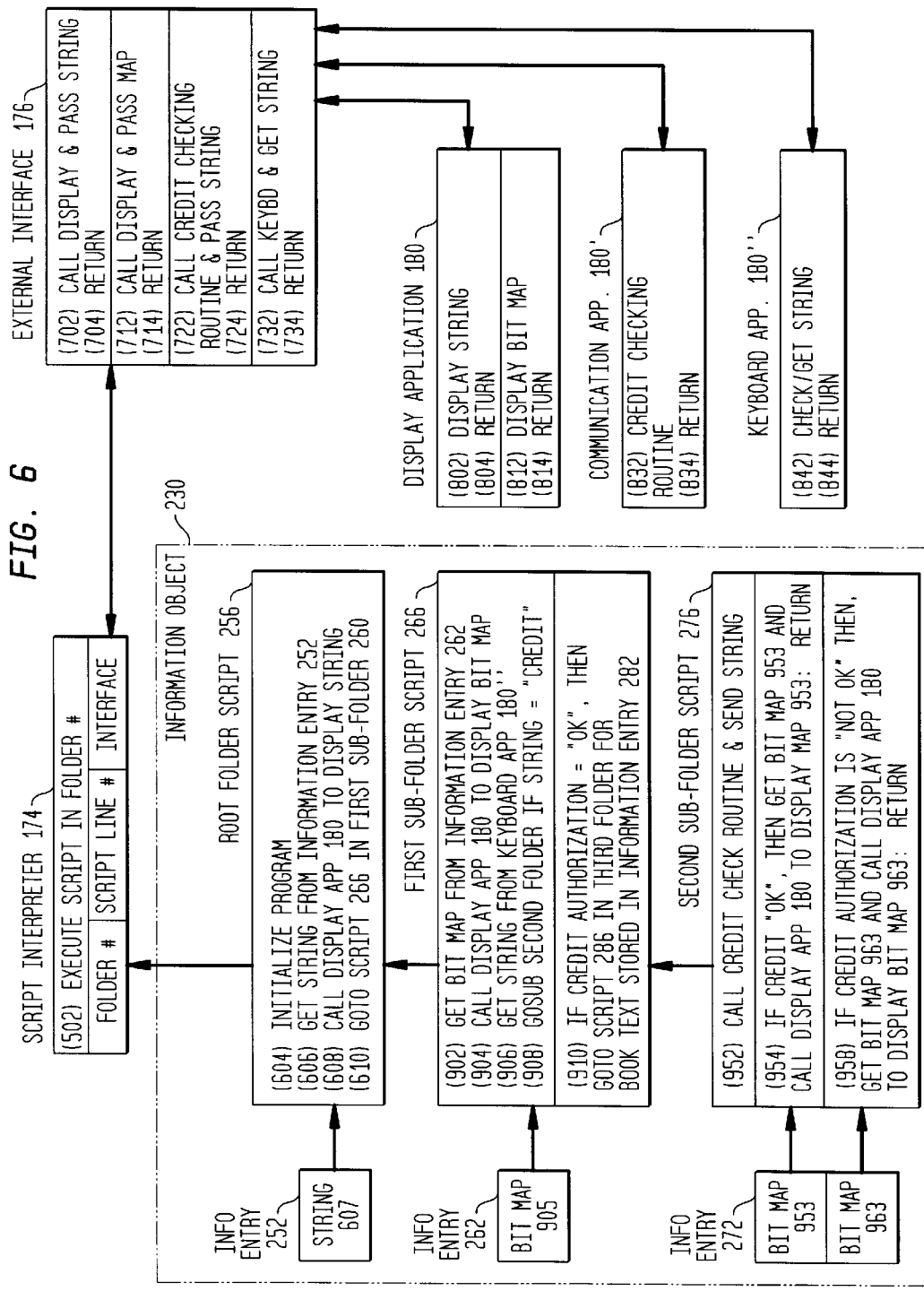

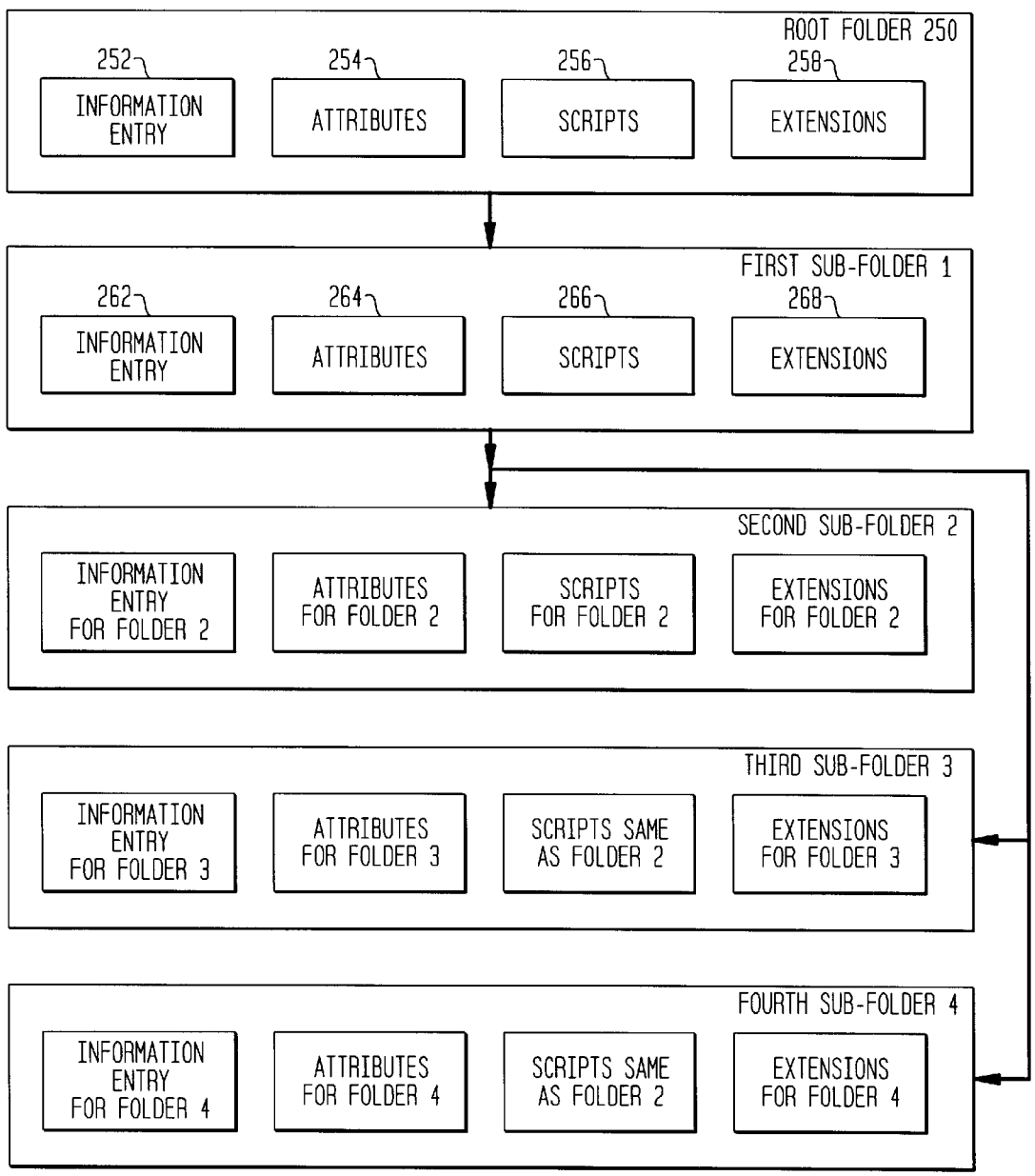

INFORMATION OBJECTS SYSTEM, METHOD, AND COMPUTER PROGRAM ORGANIZATION

BACKGROUND OF THE INVENTION

1. Field of the Invention

This invention relates to a data processing system and method, and more particularly relates to improvements in the system, organization and processing of computer programs.

2. Background

Computer programs are generally divided into compiled and interpreted types. The source code that the programmer writes is readable by humans but it is not readable by the computer. The source code must be converted into a machine language of binary numbers that can be decoded by the computer to perform the desired operations. In compiled programs, the human-readable source code written by the programmer is processed off-line by a compiler to parse the executable commands from comments, tokenize the commands, optimize the commands to eliminate redundancies, identify errors, and translate the tokenized commands into machine language object code. The object code can then be loaded and immediately executed by the computer. However, the object code cannot be easily modified. Changes to the program must be written in source code and the entire source code program then recompiled, creating a second object code module.

Contrast this with interpreted programs. In interpreted programs, an interpreter program is stored in the computer's memory. The programmer writes the application program in source code, as before. Then the source code is directly loaded into the computer's memory. The interpreter program then takes each sequential word of the source code and performs many of the steps performed by a compiler, but in real time. The interpreter parses each word to identify the executable commands, it tokenizes the commands, optimizes the commands to eliminate redundancies, identifies errors, and translates the tokenized commands into machine language object code. The object code is then immediately executed by the computer. Interpreted programs have the advantage that they can be easily modified. Changes to the program can be written in source code and immediately reloaded and executed by the interpreter. However, interpreted programs have the disadvantage that they are slower than compiled programs, since the overall processing time must include the time for running the interpreter program, itself.

Program organization has evolved from procedural program organization to more modern object oriented programming. Object oriented programming is a technique to organize the source code into objects, where the data structures and the behavior are associated as a single entity. While object oriented programming helps software developers write source code more effectively, the association of data and behavior is merely an abstract representation of the source code. In reality, data and behavior do not travel together in the same object.

Software is designed to operate on specific data sets. The software program loads the data from a database or independent file structure and performs actions on that data. In some cases, the information is received via a communications link between two software programs, but the basic process is the same. This is true for all environments, including Windows and Java. Object oriented programming is merely a way of thinking and does not reflect the realties that data and behavior do not travel together. The data has no behavior of its own and cannot assist, direct, or otherwise enable an application to process it. What is needed is an entirely new way of moving data and its corresponding behavior together.

The invention disclosed herein addresses the problems associated with interfacing information to applications. Software applications are built to process a given set of information and, as a result, do not adapt to the input of varied forms of information very easily. Information objects, in accordance with the invention, change the model for information by providing a layer of software and a structured container that envelopes the information.

SUMMARY OF THE INVENTION

An information object allows arbitrary structured or unstructured information to be bundled with instructions for processing. The object is packed into a container with a well defined structure that is processed on a client computer system. The client computer system possesses a runtime environment that processes the information object and allows it to communicate with other applications. The information object is fundamentally different from a file system or other types of container systems in its assignment of context to entries. By applying a context identifier, the runtime system which processes the information object retrieves selected entries for selected tasks.

The entries are combined into folders, which are nested in a hierarchical fashion. A manifest identifies each of the entries and how the folders are organized. Each entry belongs to at least one folder. Each folder also belongs to at least one other folder, and there is a single root folder at the top of the folder tree.

In one aspect of the invention, the system provides computer programs to a computer having a memory and a processor, the memory including a stored application program. A runtime system is stored in the memory, including a loader program, a script interpreter program, and an external interface program. An information object buffer is formed in the runtime system, including a manifest buffer, and at least one folder buffer including an information entry buffer and a scripts buffer.

In accordance with the invention, an information object is stored in the memory, including a manifest, and at least a root folder including an information entry portion and a scripts portion. The information entry contains data to be operated on and the script contains executable instruction code. The folders also include an attributes portion containing additional data to be operated on and an extensions portion containing additional executable instruction code. The manifest of the information object includes a description of all the folders in the information object.

The loader loads the manifest in the manifest buffer and uses the description to identify the root folder. The loader then loads the information entry in the information entry buffer and the script in the scripts buffer. Then the loader the transfers control to the script interpreter program.

The script interpreter program then executes the executable instruction code in the script of the root folder, to operate on the data in the information entry portion. Control is then passed to sub-folders in the hierarchy of folders contained in the information object. The script interpreter interprets and executes the script statements in each of the sub-folders of the information object. Some of the script statements make calls to the external application programs through the external interface of the runtime system. The external application programs can access data stored in the information entries of the information object while performing their functions.

The resulting invention solves the problems associated with interfacing information to applications and provides a flexible architecture to adapt to the input of varied forms of information. Information objects, in accordance with the invention, change the model for information by providing a layer of software and a structured container that envelopes the information.

BRIEF DESCRIPTION OF THE DRAWINGS

FIG. 1 is an architectural diagram of a processor 100, showing the runtime system 170, including an information object buffer 130.

FIG. 3 is a flow diagram of the loader 172 loading the components of the information object 230, into the buffer 130 of the runtime system 170.

FIG. 5 Shows a hierarchical organization of folders for the example of FIG. 4, where an information object 230 embodies the text of a book that is offered for sale.

FIG. 6 shows the system organization of the runtime system 170 after the loader 172 has loaded the information object into the user's computer, in the example of FIG. 4.

FIG. 7 shows a hierarchical organization of folders for a second example of the invention, where an information object 230 embodies the text of three books in three sub-folders 2, 3, and 4, that are offered for sale.

DESCRIPTION OF THE PREFERRED EMBODIMENTS

Figure 2A:
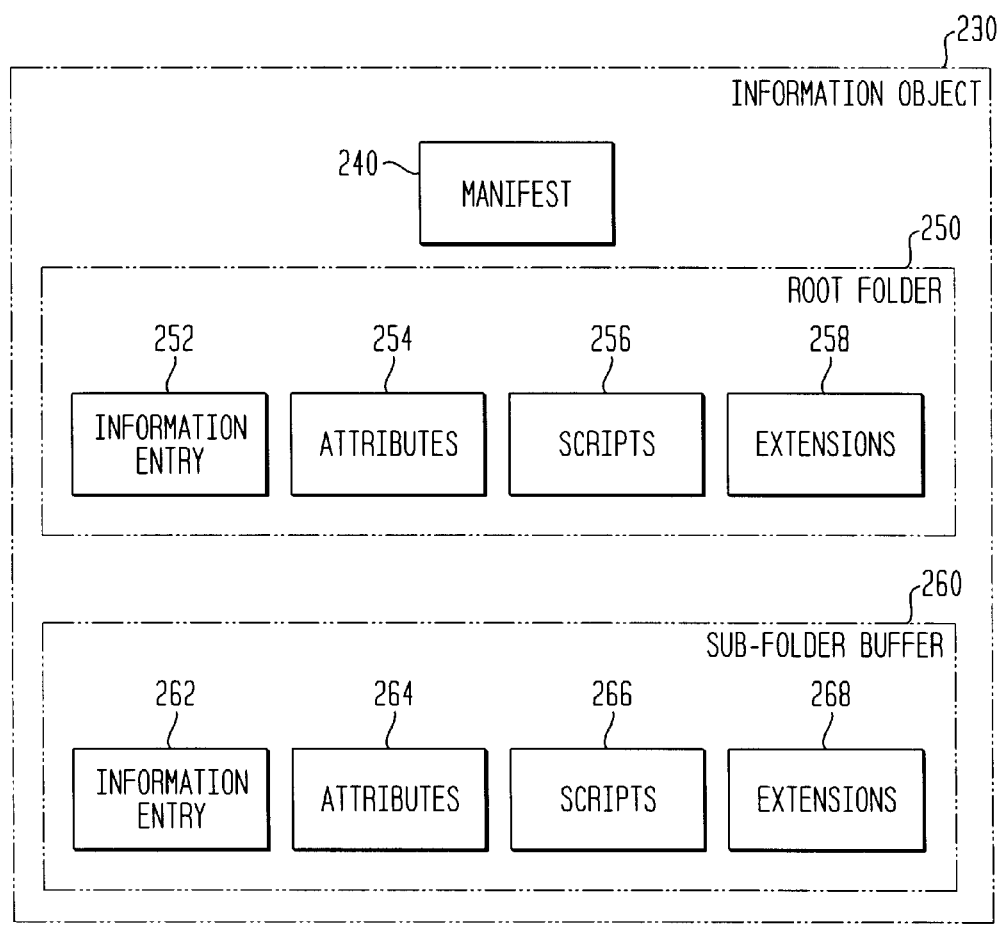
FIG. 2A shows the organization of an information object 230, including a manifest and two folders.

FIG. 1 is an architectural diagram of a computer processor 100, showing the runtime system 170, including an information object buffer 130. The computer processor 100 includes the memory 102 connected by the bus 104 to the disk drive 106, the I/O adapter 108, the processor 110, and the network adapter 112. Network adapter 112 connects the computer to the network 115, such as the internet network. Processor 110 executes encoded programmable instructions stored in the memory 102.

In one aspect of the invention, the system provides computer programs to the computer 100. The memory 102 includes an operating system 120 and a stored application program 180. A runtime system 170 is stored in the memory 102, including a loader program 172, a script and extensions interpreter program 174, and an external interface program 176.

An information object buffer 130 is formed in the runtime system 170, including a manifest buffer 140, and at least one folder buffer 150. The root folder buffer 150 includes an information entry buffer 152 and a scripts buffer 156. The root folder buffer 150 of the information object buffer 130 also includes an attributes buffer 154 and an extensions buffer 158.

The information object buffer 130 also includes one or more sub-folder buffers 160. The sub-folder buffers 160 includes an information entry buffer 162 and a scripts buffer 166. The sub-folder buffer 160 of the information object buffer 130 also includes an attributes buffer 164 and an extensions buffer 168.

FIG. 2A shows the organization of an information object 230, including a manifest and two folders. The information object 230 includes a manifest 240, and at least one folder 250. The root folder 250 includes an information entry portion 252 and a scripts portion 256. The root folder 250 of the information object 230 also includes an attributes portion 254 and an extensions portion 258.

The information object 230 of FIG. 2A also includes one or more sub-folders 260. The sub-folder 260 includes an information entry portion 262 and a scripts portion 266. The sub-folder 260 of the information object 230 also includes an attributes portion 264 and an extensions portion 268.

Figure 2B:
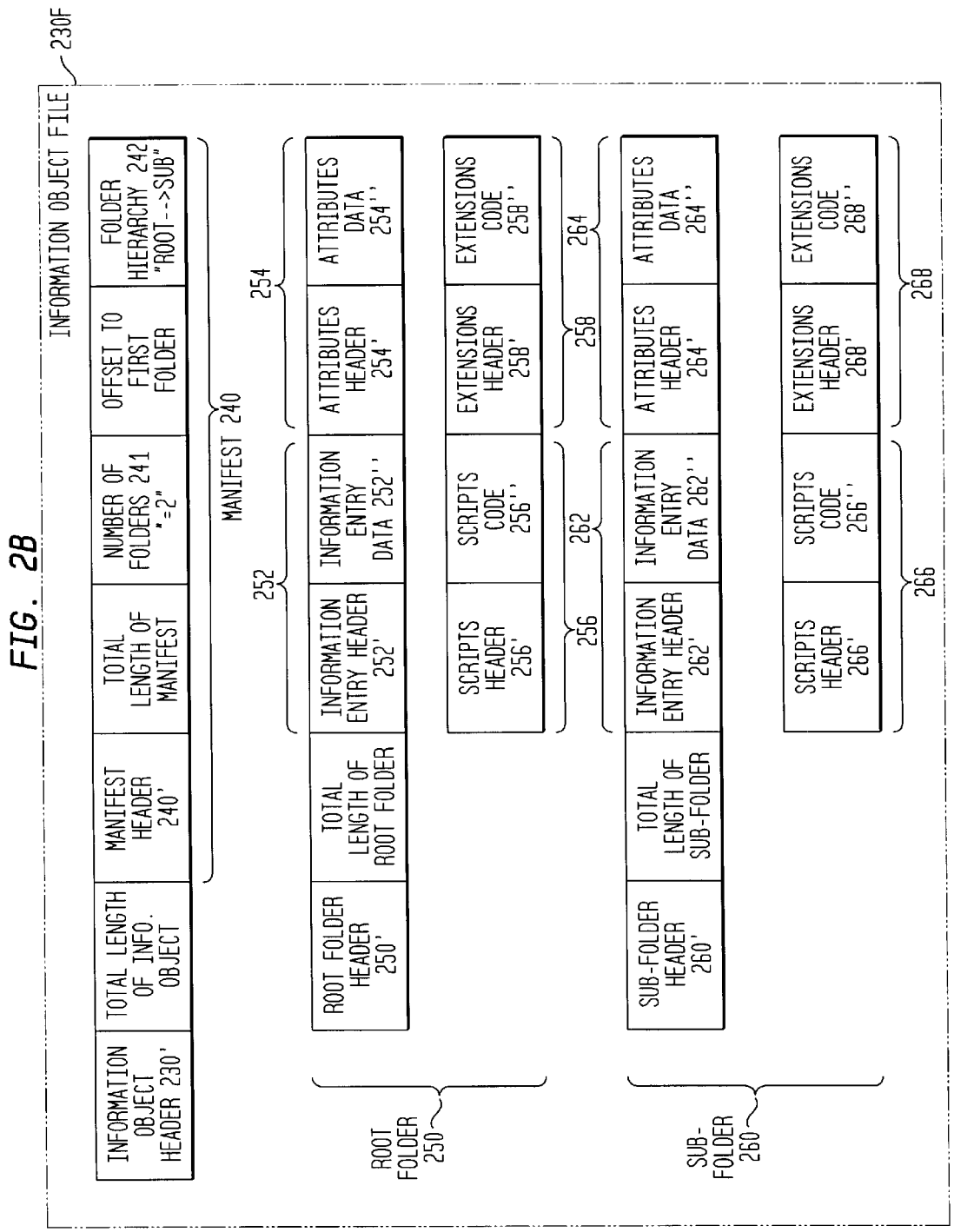
FIG. 2B shows the layout of the components of the information object 230F, in a file, before it is loaded by the loader into the information object buffer 130 of the processor 100.

FIG. 2B shows the layout of the components of the information object 230, in a file 230F, before it is loaded by the loader 172 into the information object buffer 130 of the computer processor 100. The information object file 230F of FIG. 2B includes the information object header 230' that identifies the object 230 as an information object and that enables the loader 172 to recognize the beginning of the object. A field is included to provide the total length of the information object file 230F. The manifest portion 240 includes the manifest header 240' that enables the loader 172 to recognize the beginning of the manifest portion. The manifest portion includes a field providing the total length of the manifest, a field 241 stating the number of folders in the information object 230, a field stating the memory offset from the beginning of the information object to the first occurring folder in the information object file 230F, and a field 242 that states the organization of the folder hierarchy in the information object 230. The manifest is used by the loader 172 to locate and identify the several folders 250 and 260 in the information object file 230F.

FIG. 2B shows the layout of the root folder 250 in the information object file 230F. The root folder 250 includes the root folder header 250', a field stating the total length of the root folder, the information entry portion 252 which includes the header 252' and data 252", and the scripts portion 256 which includes the header 256' and code 256". The root folder 250 of the information object 230 also includes the attributes portion 254 which includes the header 254' and the data 254" and the extensions portion 258 which includes the header 258' and the code 258". The headers enable the loader 172 to recognize the beginning of the respective portions.

FIG. 2B also shows the layout of the sub-folder 260 in the information object file 230F. The sub-folder 260 includes the sub-folder header 260', a field stating the total length of the sub-folder, the information entry portion 262 which includes the header 262' and data 262", and the scripts portion 266 which includes the header 266' and code 266". The subfolder 260 of the information object 230 also includes the attributes portion 264 which includes the header 264' and the data 264" and the extensions portion 268 which includes the header 268' and the code 268". The headers enable the loader 172 to recognize the beginning of the respective portions.

An information object is a mechanism that allows arbitrary information, structured or unstructured, to be bundled with instructions for processing. The object itself is packed into a container with a well defined structure that can be processed on a client computer system. The client computer system possesses a runtime environment that can process the information object and allow it to communicate with other applications.

The information object is a structured object containing a collection of files called entries. Each of these entries has a context, defining what kind of entry it is. The entries are combined into folders, which can be nested in a hierarchical fashion. A manifest identifies each of the entries and how the folders are organized. In this way, the information object is organized like a file Each entry belongs to at least one folder; entries may belong to more than one folder. Each folder also belongs to at least one other folder. The information object works best when the memberships are acyclic, although nothing specifically precludes cyclic references. There is a single root folder at the top of the folder tree.

The information object is fundamentally different from a file system or other types of container systems in its assignment of context to entries. By applying a context identifier, the runtime system which processes the information object can retrieve certain entries for certain tasks. Each of the entries designated information entry, script entry, attribute entry, and extension entry, is simply a standard entry with an applied context. The information object runtime system evaluates these context entries and uses each one differently. Three basic contexts include but are not limited to information, script, and extension. An information entry is an arbitrary file entry containing any type of data, either structured or unstructured. It contains the core information that is processed by the script and extension entries. The information entry is intended to carry information that will ultimately travel to an application via the information object, but is not limited to that function. Extensions, scripts and the information object runtime system may use information entries for other operations, such as template processing.

A script entry is a file containing machine independent program instructions, which will be processed by the information object runtime. Folders and entries may have corresponding scripts defining what actions are to take place for that entity. A folder script may define the business rules surrounding accessing a particular entry in the folder. An entry script could define any actions that need to take place in order to transmit the entry to a particular application.

The extension entry is also a set of program instructions. These instructions are coded in a lower order language to allow for more complicated operations to be applied to the information object without modifying the runtime environment. Extensions would be directly callable by the script language.

Operation

The information object is fundamentally different from other file aggregation mechanisms (such as ZIP and tar files) in that the container is not processed like a document on a client computer system. An information object is processed as a program. The information object is loaded into a runtime environment, which processes the container and creates the logical folder structure described herein. It then seeks out the script in the root folder and begins to execute it. The script supplies detailed instructions as to how the information entries are to be processed. To fully execute the script and make the information in the object available to external applications, the run time system provides interface mechanisms including but not limited to events, exposed methods and properties. The object runtime system can call into a method made available by an external application. Similarly, the external application can call into the runtime system to request the information in the object or to run a particular set of instructions in the script.

The loader and interpreter can also use entries with specific contexts within the scope of a given application. Some examples include but are not limited to the following: Rights management: rights management is the specification of rights, conditions and fees for use of information. The loader and interpreter can use an entry with a rights management language specified inside to permit access to a script or to generate information (prices, expirations) that can be used by the script during processing.

Attribute data: name/value pairs can be stored in an attribute file, providing some static data that may be usable by the script during runtime. Digital signatures: the authenticity and the source of the object can be determined by including entries containing digital signatures. The loader can evaluate the digital signatures to determine whether the object has been altered before running the scripts inside.

Because the information object is run as a program, it has the opportunity to provide the glue layer between information and applications. As applications take a more minimal form, the information object can use them as data viewers, driving the information into the application. Likewise, for information which changes format and adopts new characteristics, the information object can provide and interface layer for the an application, allowing the application to interrogate the information object for the information that it wishes to use. The information object reshapes many of the classical object characteristics, including encapsulation of methods and data in the same logical object. The object's program instructions (code) and information (data) are joined together in the object's persistent state. The persistent state of an information object can be a file or record in a database, but whatever that form is, the information and the code that operates on it are joined and travel together in the information object.

The code in the information object is truly bundled with the data. Current software objects offer methods and data, but the object is presumed to have a little static data. Further, software objects and their data travel separate paths in object request broker systems because of cross platform operational concerns and the impracticality of bundling large code with large data. The information object invention disclosed herein rethinks that approach by using a lightweight, cross platform scripting language and a runtime system. The runtime system is expected to be present on the client system to execute the information object's script. The object is executed via a runtime system on the client computer. Therefore, the code in the object must be platform independent. The information entries in the information object are presented to an application in ways defined by the scripts inside the object. The information may be presented in any number of ways, such as raw data, a canonical representation, or after having been transformed from its original form to another form. A canonical representation could provide pre-processed data elements from the information, using the script and extensions to parse and process the raw information. A transform application example would be the process of uncompressing and decrypting the raw data before transmitting it to an application.

Applications

There are many possible applications for information objects including but not limited to the following:

Electronic commerce for information—The scripts in the information object define the business rules under which the information inside is purchased. After satisfying itself that payment was collected, the information is released to a waiting application.

Electronic commerce for functions/programs—The scripts inside the object define how a particular information base is to be queried to retrieve data on a particular subject. Upon satisfying itself that payment was collected, the information object runs the queries against the information base and returns the results.

Software rental—The information object collects payment and retrieves a license that allows an end user to run the software for a particular span of time. The information object then retrieves the software out of the container and runs it directly. The actual software could be embedded in the information object as an extension that is decrypted and then executed.

FIG. 3 is a flow diagram of the loader 172 loading the components of the information object 230, into the buffer 130 of the runtime system 170. In step 302 the loader 172 identifies the information object 230 by its header 230'. In step 304 the loader 172 identifies and loads the manifest portion 240 in the manifest buffer 140 and uses the description in FIG. 2B to identify the folder portions 250 and 260. In step 306 the loader identifies the root folder 250 by its header 250'. In step 308, the loader 172 then identifies and loads the information entry portion 252 in the information entry buffer 152. In step 310, the loader 172 then identifies and loads the attributes portion 254 in the attributes buffer 154. In step 312, the loader 172 then identifies and loads the scripts portion 256 in the scripts buffer 156. In step 314, the loader 172 then identifies and loads the extensions portion 258 in the extensions buffer 158.

Step 316 of FIG. 3 handles any additional folders, such as the sub-folder 260. The loader identifies the sub-folder 260 by its header 260'. The loader 172 then identifies and loads the information entry portion 262 in the information entry buffer 162. The loader 172 then identifies and loads the attributes portion 264 in the attributes buffer 164. The loader 172 then identifies and loads the scripts portion 266 in the scripts buffer 166. The loader 172 then identifies and loads the extensions portion 268 in the extensions buffer 168.

Figure 4:
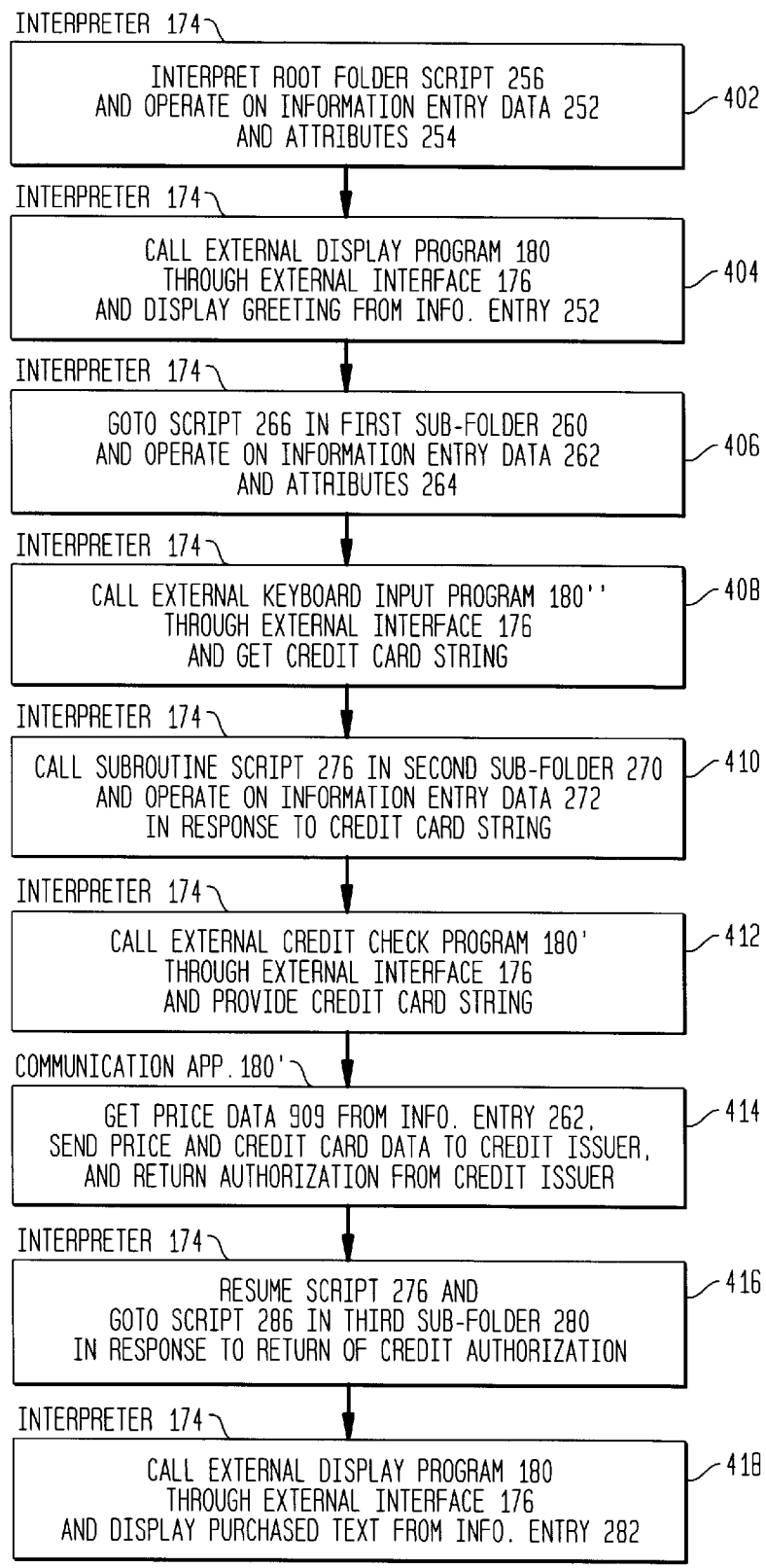
FIG. 4 is a flow diagram of an example operation of the script and extension interpreter 174, interpreting and executing the scripts code of the information object 230 and interacting with the external application program 180'.
Figure 6A:
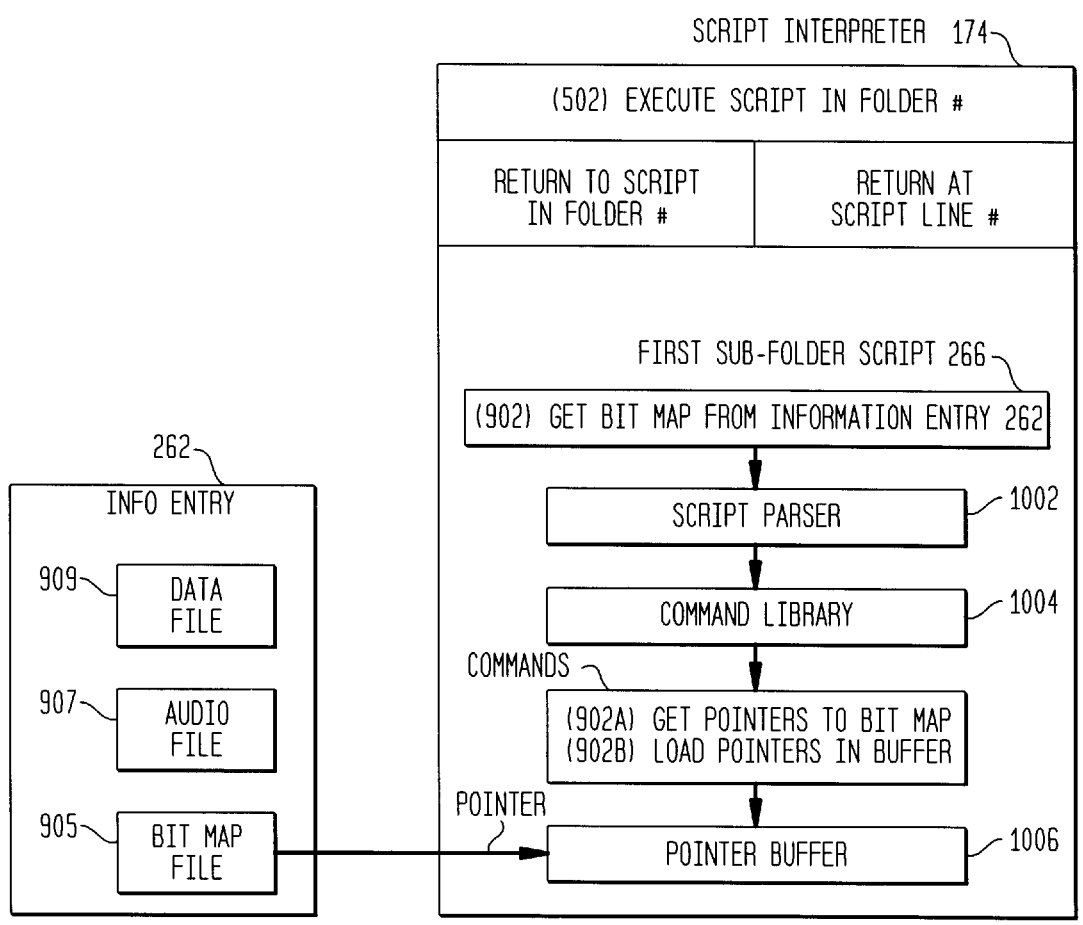
FIG. 6A shows the script interpreter 174 as it interprets the script statement 902 and gets the pointer to the bit map file 905 in the information entry 262 where the preview text of the book is stored, in the example of FIG. 4.
Figure 6B:
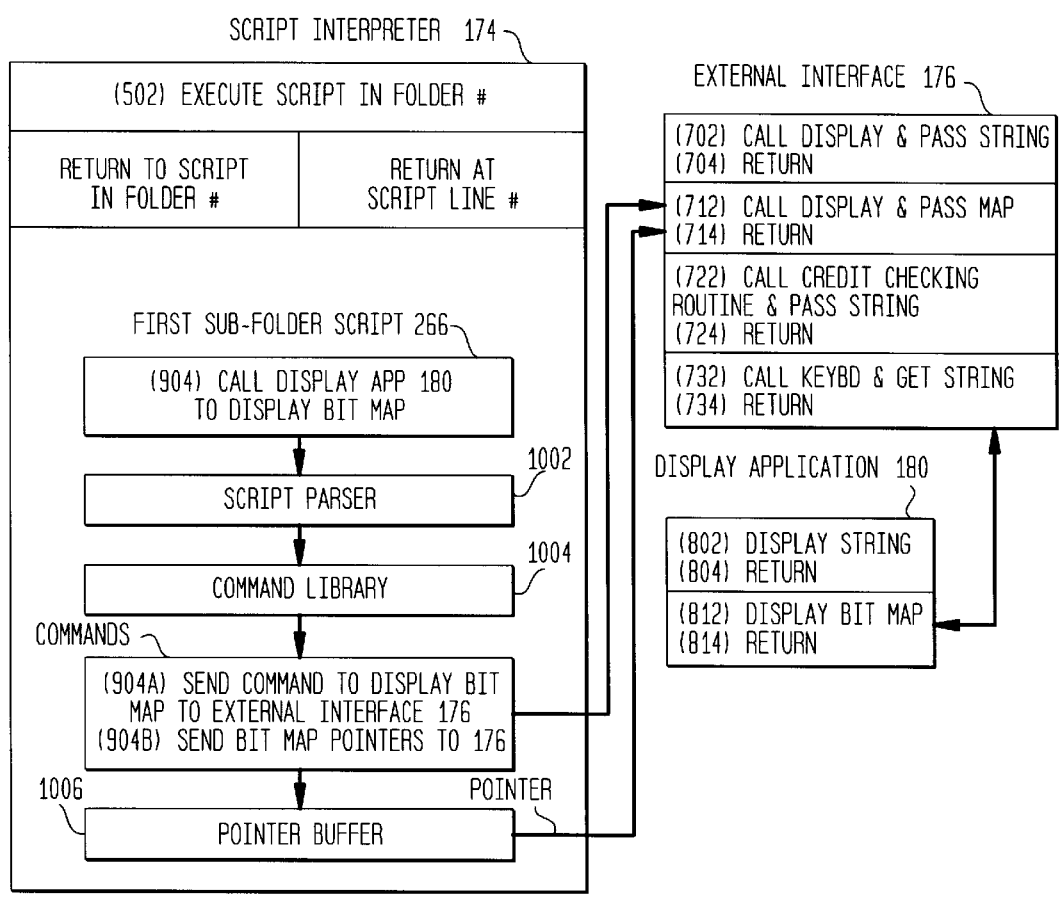
FIG. 6B shows the script interpreter 174 as it interprets the script statement 904 and sends a command to the external interface 176, to display the bit map, in the example of FIG. 4.

In step 318 the loader then transfers control to the script interpreter program 174. FIGS. 4, 5, 6, 6A, and 6B describe a first example of the structure and operation of the script and extensions interpreter 174 and its interaction with external application programs 180, 180', and 180". A flow diagram of the example operation is shown in FIG. 4. The example is based on an information object 230 shown generally in FIG. 5, that embodies the text of a book that is offered for sale. After the loader 172 has loaded the information object into the user's computer, the system organization of the runtime system 170 is as shown in FIG. 6. The script interpreter 174 interprets and executes the script statements in the folders of the information object. Some of the script statements make calls to the external application programs through the external interface 176. The external application programs in FIG. 6 include the display application 180, the communication 180', and the keyboard application 180".

The script statements 604–610 in the root folder script 256 initialize the system, access the information entry 252, and send a greetings message string 607 to the external interface 176. Instructions 702–704 then call the display application 180 and pass the string to it. Instructions 802–804 display the string to the user.

Then the first sub-folder 266 presents a preview of the book. The script interpreter 174 is shown in FIG. 6A as it interprets the script statement 902. The script parser 1002 identifies the script statement and passes it on to the command library 1004. The command library outputs the commands 902A and 902B which gets the address pointer to the bit map file 905 in the information entry 262 where the preview text of the book is stored. The pointer is buffered in pointer buffer 1006. Other files can be present in the information entry 262, including the audio file 907 and the data file 909. The script interpreter 174 is shown in FIG. 6B as it interprets the script statement 904 and sends a command to the external interface 176, to display the bit map. The script parser 1002 identifies the script statement and passes it on to the command library 1004. The command library outputs the commands 904A and 904B which sends the command to display the bit map to the external interface 176. It also sends the address pointer to the bit map file 905 from pointer buffer 1006. The external interface 176 then calls the external display application program 180 to display the bit map. Instructions 712–714 then call the display application 180 and pass the bit map to it. Instructions 812–814 display the bit map to the user. The user is then offered a full copy of the book in exchange for a charge to the user's credit card account.

The script interpreter 174 then interprets script statement 906 and sends a command to the external interface 176, to wait for an entry by the user at the keyboard. The external interface 176 instructions 732–734 then call the external keyboard application program 180" to get the user's entry at the keyboard. If the user types in the credit card number, script statement 908 of the first sub-folder 266 calls a subroutine 952 in the second sub-folder 276. The Instruction 952 of the second sub-folder 276 then calls an external communications application program 180' to perform a credit checking routine.

Figure 6C:
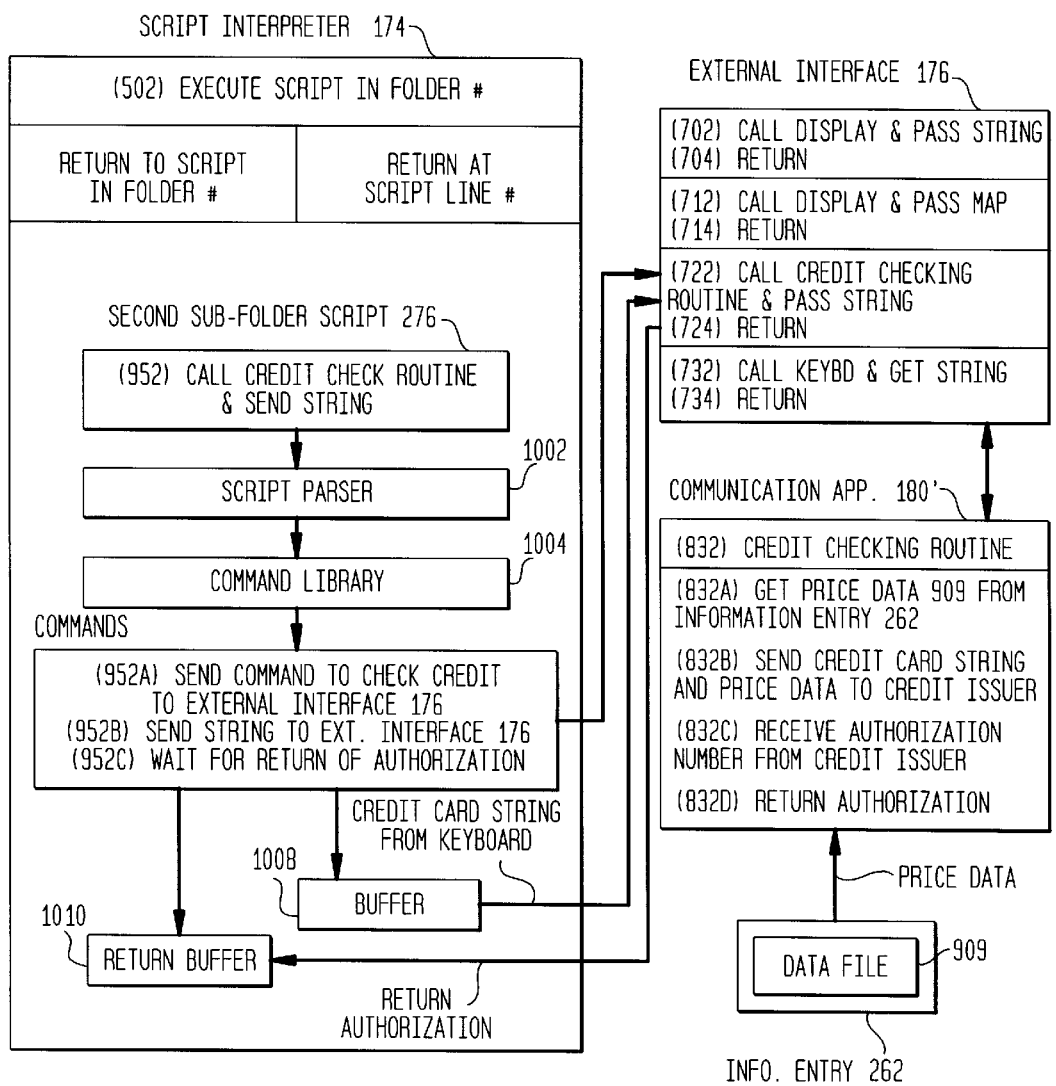
FIG. 6C shows the script interpreter 174 as it interprets the script statement 952 and sends a command to the external interface 176 to call the external credit check routine 832, in the example of FIG. 4.

The script interpreter 174 is shown in FIG. 6C as it interprets the script statement 952 and sends a command to the external interface 176 to call the external credit check routine 832. The user's credit card number string is also sent. The script parser 1002 identifies the script statement and passes it on to the command library 1004. The command library outputs the commands 952A, 952B, and 952C which sends the command to the external interface 176. It also sends the credit card string that the user entered at the keyboard and which is buffered in buffer 1008. The external interface 176 instructions 722–724 then call the external communication application program 180" and its credit checking program 832, to get an authorization from the credit card issuer for the user's charge to the credit card account. The credit card string is also passed to the credit checking routine 832.

The external interface 176 then calls the external communications application program 180' to run the credit checking routine 832. Instruction 832A of the credit checking routine 832 gets the price data 909 for the proposed purchase, from the information entry 262 of the first sub-folder 260. Instruction 832B if the credit checking routine 832 then sends the credit card string and the price data to the credit card issuer for authorization of the credit charge. Instructions 832C and 832D then receive the credit authorization from the issuer and then return the issuer's authorization to the script interpreter 174, through the external interface 176. The authorization is buffered in return buffer 1010.

Control is then returned from the communications application program 180' to the script interpreter 174, which resumes interpreting script statements in the second sub-folder script 276. If the user's credit authorization is "OK", then a first bit map 953 is accessed from information entry 272 and displayed to the user by script statement 954 and the program returns to statement 908 in the first sub-folder script 266. However, If the user's credit authorization is "NOT OK", then a second bit map 963 is accessed from information entry 272 and displayed to the user by script statement 958 and the program returns to statement 908 in the first sub-folder script 266.

As a result of a successful credit authorization, the script statement 910 in the first sub-folder script 266 branches to script 286 in the third sub-folder 280, where the full text of the book is stored in information entry 282. The script 286 of the third sub-folder presents the purchased text of the book to the user.

The flow diagram of FIG. 4, presenting the example operation of the interpreter 174 and the external credit checking program 180', is given as follows.

In step 402, the interpreter 174 does the following: interpret root folder script 256 and operate on information entry data 252 and attributes 254.

In step 403 the interpreter 174 does the following: call external display program 180 through external interface 176 and display greeting from information entry 252.

In step 406 the interpreter 174 does the following: goto script 266 in first sub-folder 260 and operate on information entry data 262 and attributes 264.

In step 408 the interpreter 174 does the following: call external keyboard input program 180" through external interface 176 and get credit card string.

In step 410 the interpreter 174 does the following: call subroutine script 276 in second sub-folder 270 and operate on information entry data 272 in response to credit card string.

In step 412 the interpreter 174 does the following: call external credit check program 180' through external interface 176 and provide credit card string.

In step 414 the communication app. 180' does the following: get price data 909 form information entry 262, send price and credit card data to credit issuer, and return authorization from credit issuer.

In step 416 the interpreter 174 does the following: resume script 276 and goto script 286 in third sub-folder 280 in response to return of credit authorization.

In step 418 the interpreter 174 does the following: call external display program 180 through external interface 176 and display purchased text from information entry 282.

FIG. 7 shows a hierarchical organization of folders for a second example of the invention, where an information object 230 embodies the text of three books in three sub-folders 2, 3, and 4, that are offered for sale. The information object 230 (as referred to in FIG. 2A) has five folders: a root folder 250, sub-folder 1 (referred to as 260 in FIG. 2A) that is subsidiary to the root folder, and sub-folders 2, 3, and 4 that are subsidiary to sub-folder 1. The root folder script 256 is given in Table 1. The root folder script finds sub-folder 1 in the information object 230 and directs sub-folder 1 to display its contents. The script 266 for sub-folder 1 is shown in Table 2. The script 266 in sub-folder 1 loads an extension 268 that talks to an external display application program 180 (as referred to in FIG. 1) and tells it to display a particular information entry 262 contained in sub-folder 1. In this example, the external application 180 calls a function and requests a fetch of particular elements in the sub-folder 260. The script for sub-folder 2 is shown in Table 3. The script in sub-folder 2 loads an extension to display a dialog asking for user ID and password. The script for sub-folder 2 gets information from its information entry portion and performs its task of displaying the text of the book selected by the user, in association with the external display application program 180.

TABLE 1

ROOT FOLDER SCRIPT

| PROGRAM | COMMENT |
|---|---|
| function init ( ) {<br>System.println ("Container name: "+<br>getName ( ));<br>System.println ("Initiating purchase . . . ");<br>var folder = getFolderByName ("folder.1"):<br>folder.display ( )<br>} | Initialize the system |

TABLE 2

FOLDER 1 SCRIPT

| PROGRAM | COMMENT |
|---|---|
| function display( ) {<br>html = new HTMLViewer(getName( ), this);<br>System.println ("This is " + this);<br>html.show( );<br>html.display("jtz:///motorcycle.html");<br>multidoc = new MultiDoc( ): // initialize the extension<br>function fetch(fn) {<br>System.println("Starting fetch in main folder script");<br>System.println("Asking for" + fn + "");<br>var I = fn.indexOf("/");<br>if(I! = −1) {<br>var folder = getFolder(fn.substring(O,i));<br>if (folder == null) (<br>System.println("can't find folder " + | load an extension that talks to an outside app.; logic here ensures that all is well up to this point<br>tell the outside app to display a particular Info entry in folder. 1<br>load another extension<br><br>this function is called by our outside app ("html"). The app requests a fetch on a particular element in the information entry<br><br><br>if our request really belongs to a sub-folder, then get the info from the subfolder. |

TABLE 2-continued

FOLDER 1 SCRIPT

| PROGRAM | COMMENT |
|---|---|
| fn.substring( ),I))); {  <br>return folder.fetch(fn.substring(I+1));  <br>System.println("Normal fetch from main folder")' | |
| var part = getDataPart(fn);  <br>System.println(part.toString( )); | get the info part object |
| System.println("Part for" + fn + "is + part.getName( )); | get the infor part data |
| var file = part.getData( );  <br>System.println("returning data " + file); return file; } | |

TABLE 3

FOLDER 2 SCRIPT

| PROGRAM | COMMENT |
|---|---|
| System-println ("Initiating purchase of" + getName ( )):  <br>// do we have credentials? | Called by fetch (below) if we need to pay for the information. |
| If(multidoc.userid =="") {// no credentials yet if (multidoc.getCredentials ( )) {// cancel hit return false; } } | Call an extension to display a dialog asking for user id and password. |
| return multidoc.approveBuy ('Purchase request from: "+ multidoc.userid +". Do you agree to purchase "+ this.getName ( ) + " for" + price + "?"): | Call an extension to assure that the user wants to pay for the content and return true or false accordingly. |
| Function fetch (fn) {  <br>System.println ("Asking for' "+fn +'"  <br>"); | Called by folder script's fetch function. |
| if(getAttribute ("purchased") !="YES") {  <br>if(!buy("$1.00")) {  <br>System.println ("Chose not to buy");  <br>return null; | Have we already purchased this? If not, call the ? buy? function to do so. |
| }  <br>addAttribute ("purchased", "YES"); | Remember that we have paid already. |
| System.println ("This is "+ this.getName( )); | Get the info part object |
| System.println ("Getting " + fn):  <br>var part = getDataPart (fn);  <br>System.println("We got" + part. toString( ));  <br>System.println("Folder part for "+ fn + " is" + part.getName ( )); | Get the info part data |
| var file = part.getData ( );  <br>System.println ("retuning data" + file);  <br>retun file; | |

Although a specific embodiment of the invention has been disclosed, it will be understood by those having skill in the art that changes can be made to that specific embodiment without departing from the spirit and scope of the invention.

What is claimed is:

1. A system for providing computer programs to a computer having a memory and a processor, said memory including an application program stored therein, comprising:
    a runtime system stored in said memory, including a script interpreter program and an external interface program;
    an information object stored in said memory, including a manifest portion, and at least one folder portion including an information entry portion containing data to be operated on and a scripts portion containing executable instruction code, said manifest portion having a description of said at least one folder portion, said information entry portion having a context identifier and said scripts portion having a second context identifier;
    said script interpreter program executing said executable instruction code in said scripts portion in response to said second context identifier to operate on said data in said information entry portion in response to said first context identifier to interact with said application program though said external interface program.

2. A method for providing computer programs to a computer having a memory and a processor, said memory including an application program stored therein, comprising the steps of:
    storing a runtime system stored in said memory, including a script interpreter program and an external interface program;
    inputting an information object stored in said memory, including a manifest portion, and at least one folder portion including an information entry portion containing data to be operated on and a scripts portion containing executable instruction code, said manifest portion having a description of said folder portion, said information entry portion having a context identifier and said scripts portion having a second context identifier;

executing said executable instruction code in said scripts portion with said script interpreter program in response to said second context identifier, to operate on said data in said information entry portion in response to said first context identifier to interact with said application program through said external interface program.

3. An article of manufacture for use in a computer having a memory and a processor, said memory including an application program stored therein, comprising:

a computer useable medium having computer readable program code means embodied therein for providing a method for delivering computer programs to the computer, the computer readable program code means in said article of manufacture comprising:

computer readable program code means for causing a computer to store a runtime system stored in said memory, including a script interpreter program and an external interface program;

computer readable program code means for causing a computer to input an information object stored in said memory, including a manifest portion, and at least one folder portion including an information entry portion containing data to be operated on and a scripts portion containing executable instruction code, said manifest portion having a description of said folder portion, said information entry portion having a context identifier and said scripts portion having a second context identifier; and computer readable program code means for causing a computer to execute said executable instruction code in said scripts portion with said script interpreter program in response to said second context identifier, to operate on said data in said information entry portion in response to said first context identifier to interact with said application program though said external interface program.

4. A computer program product in a computer readable medium for delivering computer programs to the computer comprising:

means for storing a runtime system in a memory, including a script interpreter program and an external interface program;

means for inputting an information object stored in said memory, including a manifest portion, and at least one folder portion including an information entry portion containing data to be operated on and a scripts portion containing executable instruction code, said manifest portion having a description of said folder portion, said information entry portion having a context identifier and said scripts portion having a second context identifier; and means for executing said executable instruction code in said scripts portion with said script interpreter program in response to said second context identifier, to operate on said data in said information entry portion in response to said first context identifier to interact with said application program through said external interface program.

5. A system for providing computer programs to a computer having a memory and a processor, said memory including an application program stored therein, comprising:

a runtime system stored in said memory, including a loader program, a script interpreter program, and an external interface program;

an information object buffer in said runtime system, including a manifest buffer, and at least one folder buffer including an information entry buffer and a scripts buffer;

an information object stored in said memory, including a manifest portion, and at least one folder portion including an information entry portion containing data to be operated on and a scripts portion containing executable instruction code, said manifest portion having a description of said folder portion, said information entry portion having a context identifier and said scripts portion having a second context identifier;

said loader program loading said manifest portion in said manifest buffer and using said description to identify said one folder portion;

said loader program loading said information entry portion in said information entry buffer and said scripts portion in said scripts buffer and transferring control to said script interpreter program;

said script interpreter program executing said executable instruction code in said scripts portion in response to said second context identifier to operate on said data in said information entry portion in response to said first context identifier to interact with said application program through said external interface program.

6. A method for providing computer programs to a computer having a memory and a processor, said memory including an application program stored therein, comprising the steps of:

storing a runtime system stored in said memory, including a loader program, a script interpreter program, and an external program;

forming an information object buffer in said runtime system, including a manifest buffer, and at least one folder buffer including an information entry buffer and scripts buffer;

inputting an information object stored in said memory, including a manifest portion, and at least one folder portion including an information entry portion containing data to be operated on and a scripts portion containing executable instruction code, said manifest portion having a description of said folder portion, said information entry portion having a context identifier and said scripts portion having a second context identifier;

loading said manifest portion with said loader program, in said manifest buffer and using said description to identify said at least one folder portion;

loading said information entry portion with said loader program, in said information entry buffer and said scripts portion in said scripts buffer and transferring control to said script interpreter program;

executing said executable instruction code in said scripts portion with said script interpreter program in response to said second context identifier, to operate on said data in said information entry portion in response to said first context identifier to interact with said application program through said external interface program.

7. An article of manufacture for use in a computer having a memory and a processor, said memory including an application program stored therein, comprising:

a computer useable medium having computer readable program code means embodied therein for providing a method for delivering computer programs to the computer, the computer readable program code means in said article of manufacture comprising:

computer readable program code means for causing a computer to store a runtime system stored in said memory, including a loader program, a script interpreter program, and an external interface program;

computer readable program code means for causing a computer to form an information object buffer in said runtime system, including a manifest buffer, and at least one folder buffer including an information entry buffer and a scripts buffer;

computer readable program code means for causing a computer to input an information object stored in said memory, including a manifest portion, and at least one folder portion including a information entry portion containing data to be operated on and a scripts portion containing executable instruction code, said manifest portion having a description of said folder portion, said information entry portion having a context identifier and said scripts portion having a second context identifier;

computer readable program code means for causing a computer to load said manifest portions with said loader program, in said manifest buffer and use said description to identify said at least one folder portion;

computer readable program code means for causing a computer to load said information entry portion with said loader program, in said information entry buffer and said scripts portion in said scripts buffer and transfer control to said script interpreter program; and computer readable program code means for causing a computer to execute said executable instruction code in said scripts portion with said script interpreter program in response to said second context identifier, to operate on said data in said information entry portion in response to said first context identifier to interact with said application program through said external interface program.

8. A computer program product in a computer readable medium for delivering computer programs to the computer, comprising:

means for storing a runtime system in a memory, including a loader program, a script interpreter program, and an external interface program;

means for forming an information object buffer including an information entry buffer and a scripts buffer;

means for inputting an information object stored in said memory, including a manifest portion, and at least one folder portion including an information entry portion containing data to be operated on and a scripts portion containing executable instruction code, said manifest portion having a description of said folder portion, said information entry portion having a context identifier and said scripts portion having a second context identifier;

means for loading said manifest portion with said loader program, in said manifest buffer and use said description to identify said one folder portion;

means for loading said information entry portion with said loader program, in said information entry buffer and said scripts portion in said scripts buffer and transfer control to said script interpreter program;

means for executing said executable instruction code in said scripts portion with said script interpreter program in response to said second context identifier, to operate on said data in said information entry portion in response to said first context identifier to interact with said application program through said external interface program.

9. A method for providing computer programs to a computer having a memory and a processor, said memory including an application program stored therein, comprising the steps of:

storing a runtime system stored in said memory, including a script interpreter program and an external interface program;

inputting an information object stored in said memory, including a manifest portion, and at least one folder portion including an information entry portion containing data to be operated on and a scripts portion containing executable instruction code, said manifest portion having a description of said at least one folder portion, said information entry portion having a context identifier and said scripts portion having a second context identifier;

executing said executable instruction code in said scripts portion with said script interpreter program in response to said second context identifier, to operate on said data in said information entry portion in response to said first context identifier to interact with said application program through said external interface program; and executing instruction code in said application program to operate on said data in said information entry portion of said information object.

10. The method of claim 9, wherein said application program performs a programmed operation and then returns control to said executable instruction code in said scripts portion interpreted with said script interpreter program.

11. A computer program product in a computer readable medium for delivering computer programs to the computer, comprising:

means for storing a runtime system in a memory, including a script interpreter program and an external interface program;

means for inputting an information object stored in said memory, including a manifest portion, and at least one folder portion including an information entry portion containing data to be operated on and a scripts portion containing executable instruction code, said manifest portion having a description of said at least one folder portion, said information entry portion having a context identifier and said scripts portion having a second context identifier;

means for executing said executable instruction code in said scripts portion with said script interpreter program in response to said second context identifier, to operate on said data in said information entry portion in response to said first context identifier to interact with said application program through said external interface program, and means for executing instruction code in said application program to operate on said data in said information entry portion of said information object.

12. The computer program product of claim 11, wherein said application program performs a programmed operation and then returns control to said executable instruction code in said scripts portion interpreted with said script interpreter program.

13. A system for providing computer programs to a computer having a memory and a processor, comprising:

a runtime system stored in said memory, including a script interpreter program;

an information object stored in said memory, including an information entry portion containing content to be operated on and a scripts portion containing executable instruction code, said information entry portion having a context identifier and said scripts portion having a second context identifier;

said script interpreter program executing said executable instruction code in said scripts portion in response to said second context identifier to identify and load entry points, attributes, extensions, and other scripts associated with the content in response to said first context identifier.

14. A method for providing computer programs to a computer having a memory and a processor, comprising the steps of:

storing a runtime system stored in said memory, including a script interpreter program;

inputting an information object stored in said memory, including an information entry portion containing content to be operated on and a scripts portion containing executable instruction code, said information entry portion having a context identifier and said scripts portion having a second context identifier;

executing said executable instruction code in said scripts portion with said script interpreter program in response to said second context identifier, to identify and load entry points, attributes, extensions, and other scripts associated with the content in response to said first context identifier.

15. An article of manufacture for use in a computer having a memory and a processor, comprising:

a computer useable medium having computer readable program code means embodied therein for providing a method for delivering computer programs to the computer, the computer readable program code means in said article of manufacture comprising:

computer readable program code means for causing a computer to store a runtime system stored in said memory, including a script interpreter program;

computer readable program code means for causing a computer to input an information object stored in said memory, including an information entry portion containing content to be operated on and a scripts portion containing executable instruction code, said information entry portion having a context identifier and said scripts portion having a second context identifier; and computer readable program code means for causing a computer to execute said executable instruction code in said scripts portion with said script interpreter program in response to said second context identifier, to identify and load entry points, attributes, extensions, and other scripts associated with the content in response to said first context identifier.

16. A method for providing computer programs to a computer having a memory and a processor, comprising:

storing a runtime system in said memory, including a script interpreter program;

storing an information object in said memory, including a first folder containing a first information entry portion including first content to be operated on and containing a first scripts portion including first executable instruction code, said first information entry portion having a first context identifier and said first scripts portion having a second context identifier;

said information object further including a second folder containing a second information entry portion including second content to be operated on and containing a second scripts portion including second executable instruction code, said second information entry portion having said first context identifier and said second scripts portion having said second context identifier;

executing said first executable instruction code in said first scripts portion with said script interpreter program in response to said second context identifier, to operate on said first content in response to said first context identifier and to identify and load entry points for said second executable instruction code in said second scripts portion; and executing said second executable instruction code in said second scripts portion with said script interpreter program in response to said second context identifier, to operate on said second content in response to said first context identifier.

17. The method of claim 16, further comprising:

said information object further including a third folder containing a third information entry portion including third content to be operated on and containing a third scripts portion including third executable instruction code;

executing said second executable instruction code in said second scripts portion with said script interpreter program, to identify and load entry points for said third executable instruction code in said third scripts portion; and executing said third executable instruction code in said third scripts portion with said script interpreter program, to operate on said third content.

18. A system for providing computer programs to a computer, comprising:

a memory for storing a runtime system in said memory, including a script interpreter program;

an information object stored in said memory, including a first folder containing a first information entry portion including first content to be operated on and containing a first scripts portion including first executable instruction code, said first information entry portion having a first context identifier and said first scripts portion having a second context identifier;

said information object further including a second folder containing a second information entry portion including second content to be operated on and containing a second scripts portion including second executable instruction code, said second information entry portion having said first context identifier and said second scripts portion having said second context identifier;

a processor coupled to said memory, for executing said first executable instruction code in said first scripts portion with said script interpreter program in response to said second context identifier, to operate on said first content in response to said first context identifier and to identify and load entry points for said second executable instruction code in said second scripts portion; and said processor executing said second executable instruction code in said second scripts portion with said script interpreter program in response to said second context identifier, to operate on said second content in response to said first context identifier.

19. The system of claim 18, further comprising:

said information object further including a third folder containing a third information entry portion including third content to be operated on and containing a third scripts portion including third executable instruction code;

said processor executing said second executable instruction code in said second scripts portion with said script interpreter program, to identify and load entry points for said third executable instruction code in said third scripts portion; and said processor executing said third executable instruction code in said third scripts portion with said script interpreter program, to operate on said third content.

20. An article of manufacture for use in a computer having a memory and a processor, comprising:

a computer useable medium having computer readable program code therein for delivering computer programs to the computer, the computer readable program code comprising:

computer readable program code for storing a runtime system in said memory, including a script interpreter program;

computer readable program code for storing an information object in said memory, including a first folder containing a first information entry portion including first content to be operated on and containing a first scripts portion including first executable instruction code, said first information entry portion having a first context identifier and said first scripts portion having a second context identifier;

said information object further including a second folder containing a second information entry portion including second content to be operated on and containing a second scripts portion including second executable instruction code, said second information entry portion having said first context identifier and said second scripts portion having said second context identifier;

computer readable program code for executing said first executable instruction code in said first scripts portion with said script interpreter program in response to said second context identifier, to operate on said first content in response to said first context identifier and to identify and load entry points for said second executable instruction code in said second scripts portion; and computer readable program code for executing said second executable instruction code in said second scripts portion with said script interpreter program in response to said second context identifier, to operate on said second content in response to said first context identifier.

21. The article of manufacture of claim 20, further comprising:

said information object further including a third folder containing a third information entry portion including third content to be operated on and containing a third scripts portion including third executable instruction code;

computer readable program code for executing said second executable instruction code in said second scripts portion with said script interpreter program, to identify and load entry points for said third executable instruction code in said third scripts portion; and computer readable program code for executing said third executable instruction code in said third scripts portion with said script interpreter program, to operate on said third content.

* * * * *